(12) United States Patent
Watkins et al.

(10) Patent No.: US 11,222,034 B2
(45) Date of Patent: Jan. 11, 2022

(54) SYSTEMS AND METHODS FOR LONG-TERM DATA STORAGE

(71) Applicant: Gamesys Ltd., London (GB)

(72) Inventors: Joshua Richard Watkins, London (GB); Juan Fernando Cervera Parrilla, London (GB)

(73) Assignee: Gamesys Ltd., London (GB)

( * ) Notice: Subject to any disclaimer, the term of this patent is extended or adjusted under 35 U.S.C. 154(b) by 881 days.

(21) Appl. No.: 14/854,123

(22) Filed: Sep. 15, 2015

(65) Prior Publication Data
US 2017/0075903 A1    Mar. 16, 2017

(51) Int. Cl.
| | |
|---|---|
| *G06F 16/00* | (2019.01) |
| *G06F 16/25* | (2019.01) |
| *G07F 17/32* | (2006.01) |
| *G06F 16/955* | (2019.01) |
| *G06F 16/23* | (2019.01) |
| *G06F 16/2455* | (2019.01) |
| *G06F 16/172* | (2019.01) |

(52) U.S. Cl.
CPC .......... *G06F 16/252* (2019.01); *G06F 16/172* (2019.01); *G06F 16/2365* (2019.01); *G06F 16/24552* (2019.01); *G06F 16/955* (2019.01); *G07F 17/3225* (2013.01); *G07F 17/3269* (2013.01)

(58) Field of Classification Search
CPC .... G06F 16/172; G06F 16/244; G06F 16/248; G06F 16/252; G06F 16/955; G06F 16/2365; G06F 16/9537; G06F 16/24552

USPC .......................................................... 707/703
See application file for complete search history.

(56) References Cited

U.S. PATENT DOCUMENTS

| | | | | |
|---|---|---|---|---|
| 8,997,229 | B1 * | 3/2015 | Huang | G06F 21/554 |
| | | | | 726/23 |
| 9,492,755 | B2 * | 11/2016 | Beeler | A63F 13/12 |
| 9,824,121 | B2 * | 11/2017 | Wang | G06F 16/24568 |
| 10,127,760 | B2 * | 11/2018 | Graham | A63F 13/71 |
| 10,880,191 | B1 * | 12/2020 | Kant | G06F 16/951 |
| 2003/0061132 | A1 * | 3/2003 | Yu, Sr. | G06Q 30/0205 |
| | | | | 705/30 |
| 2004/0044710 | A1 * | 3/2004 | Harrison | G06F 7/544 |
| | | | | 708/200 |
| 2005/0256866 | A1 * | 11/2005 | Lu | G06F 16/957 |
| | | | | 707/999.005 |
| 2006/0112153 | A1 * | 5/2006 | Bowen | G06F 16/25 |
| | | | | 707/999.204 |
| 2007/0058871 | A1 * | 3/2007 | Deligiannakis | G06F 16/283 |
| | | | | 382/224 |
| 2007/0112724 | A1 * | 5/2007 | Beach | G06F 16/20 |
| | | | | 707/999.002 |
| 2008/0046506 | A1 * | 2/2008 | Broda | G06F 16/283 |
| | | | | 709/203 |
| 2008/0249876 | A1 * | 10/2008 | Rice | G06Q 30/0212 |
| | | | | 705/14.14 |

(Continued)

*Primary Examiner* — Ashish Thomas
*Assistant Examiner* — Rezwanul Mahmood
(74) *Attorney, Agent, or Firm* — RowanTree Law Group, PLLC; Carson C. K. Fincham

(57) ABSTRACT

Systems, methods, and articles of manufacture provide for rolling long-term data storage. Optimized or enhanced rolling long-term data storage may, for example, increase processing performance and reduce operational burdens on memory resources associated with execution of analytical models.

8 Claims, 10 Drawing Sheets

(56) References Cited

U.S. PATENT DOCUMENTS

| | | | |
|---|---|---|---|
| 2009/0018996 A1* | 1/2009 | Hunt | G06F 16/2264 707/999.002 |
| 2009/0082081 A1* | 3/2009 | Walker | G07F 17/329 463/17 |
| 2009/0204574 A1* | 8/2009 | Vlachos | G06F 16/2474 707/999.003 |
| 2009/0228485 A1* | 9/2009 | Handy | G06F 16/25 707/999.007 |
| 2010/0279708 A1* | 11/2010 | Lidsrom | H04W 4/02 455/456.1 |
| 2010/0318545 A1* | 12/2010 | Handy | G06F 16/2455 707/759 |
| 2011/0029840 A1* | 2/2011 | Ozzie | H03M 13/05 714/763 |
| 2011/0093511 A1* | 4/2011 | Tapper | G06F 16/2477 707/803 |
| 2011/0150309 A1* | 6/2011 | Barfett | G06T 7/11 382/131 |
| 2011/0208701 A1* | 8/2011 | Jackson | G06F 16/2445 707/687 |
| 2011/0261049 A1* | 10/2011 | Cardno | G06Q 10/10 345/419 |
| 2011/0283099 A1* | 11/2011 | Nath | H04L 9/008 713/150 |
| 2012/0246298 A1* | 9/2012 | McGowan | H04L 67/288 709/224 |
| 2012/0246299 A1* | 9/2012 | Carls | H04L 41/5067 709/224 |
| 2012/0330996 A1* | 12/2012 | Chang | G06F 16/24556 707/769 |
| 2013/0035909 A1* | 2/2013 | Douady | G06Q 40/06 703/2 |
| 2013/0080374 A1* | 3/2013 | Karlsson | G06Q 10/04 706/52 |
| 2013/0086109 A1* | 4/2013 | Huang | G06F 16/244 707/770 |
| 2013/0103681 A1* | 4/2013 | Renders | G06F 16/14 707/728 |
| 2013/0159832 A1* | 6/2013 | Ingargiola | G06Q 40/00 715/220 |
| 2013/0231189 A1* | 9/2013 | Beeler | A63F 13/79 463/42 |
| 2013/0339473 A1* | 12/2013 | McCaffrey | H04L 67/22 709/216 |
| 2014/0045589 A1* | 2/2014 | Paradise | A63F 13/00 463/29 |
| 2014/0081989 A1* | 3/2014 | Chang | G06F 11/2071 707/748 |
| 2014/0357344 A1* | 12/2014 | Grier | A63F 13/352 463/25 |
| 2014/0376794 A1* | 12/2014 | Dumoulin | G01R 33/5611 382/131 |
| 2015/0142520 A1* | 5/2015 | Bala | G06Q 30/0203 705/7.32 |
| 2015/0242439 A1* | 8/2015 | Freedman | G06F 16/2322 707/703 |
| 2015/0302467 A1* | 10/2015 | Marenko | G06Q 30/0275 705/14.46 |
| 2016/0063144 A1* | 3/2016 | Cooke | G06F 30/20 703/2 |
| 2016/0140153 A1* | 5/2016 | Massarella | G06F 16/2272 707/743 |
| 2016/0328432 A1* | 11/2016 | Raghunathan | G06F 16/2264 |
| 2017/0006135 A1* | 1/2017 | Siebel | H04L 69/40 |
| 2017/0068705 A1* | 3/2017 | Rinke | G06F 9/50 |
| 2017/0075903 A1* | 3/2017 | Watkins | G07F 17/3225 |
| 2021/0263945 A1* | 8/2021 | Siebel | H04L 67/10 |

\* cited by examiner

SYSTEMS AND METHODS FOR LONG-TERM DATA STORAGE

BACKGROUND

Storage of large amounts of data, such as with respect to online transactions and/or events, had become a common necessity for computer systems in various commercial and industrial applications. It is often impractical to store all details of each transaction or event over long periods of time, however, and the storage requirements for such "raw" data storage are often unpredictable.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments presented herein are descriptive of systems, apparatus, methods, and articles of manufacture for long-term (or other high-volume) data storage. In some embodiments, large amounts of time-based data may be aggregated to reduce storage constraints, but may also be stored in conjunction with distribution data to preserve details of the aggregated data. According to some embodiments, for example, aggregated data may be stored in conjunction with six (6) degree polynomial data representing data distributions over one or more aggregated time periods, which may provide various benefits such as decreased memory footprint and/or increased data processing times.

Figure 1A:
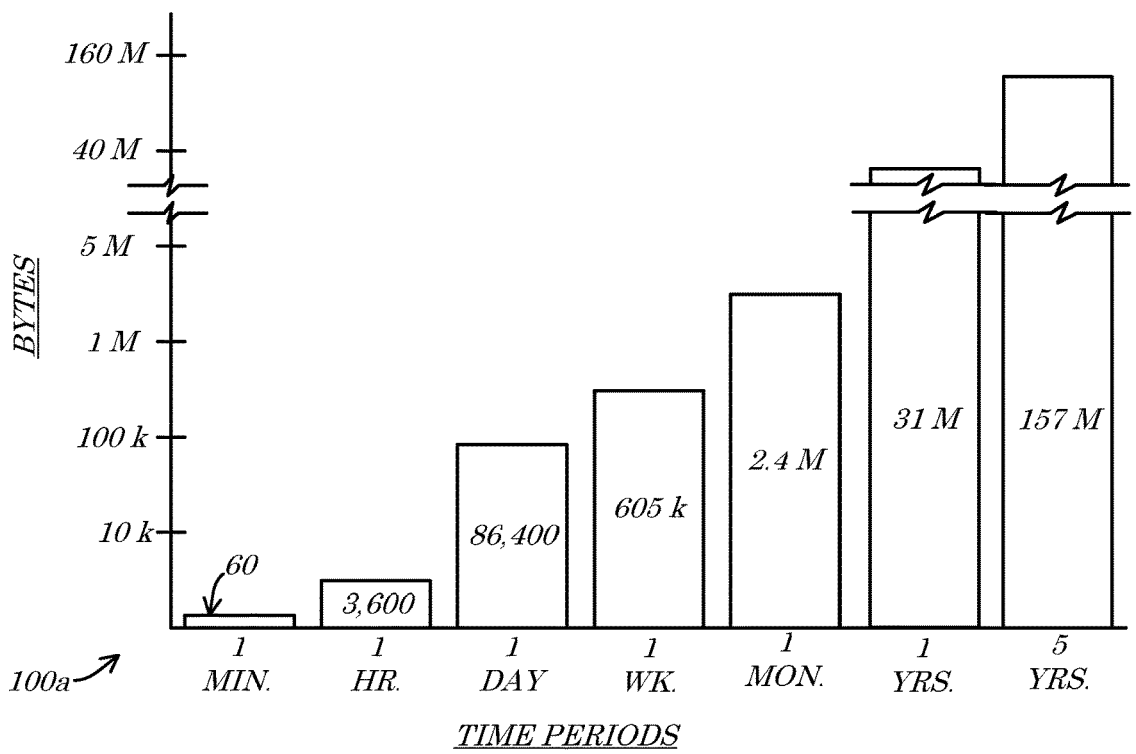
FIG. 1A and FIG. 1B are graphs of prior art data storage techniques.
Figure 1B:
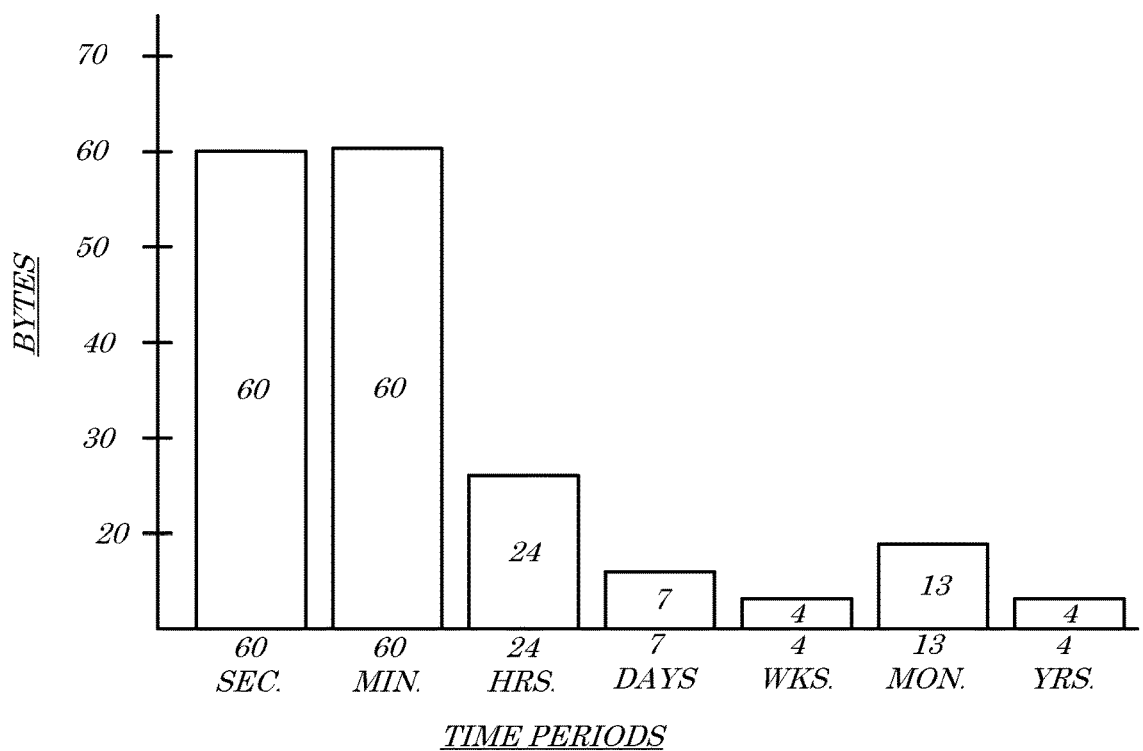

For a better understanding of the differences between the long-term data storage techniques described herein with respect to typical long-term data storage techniques, reference is first made to FIG. 1A and FIG. 1B, in which graphs 100a-b of prior art data storage techniques are shown. As depicted in FIG. 1A, for example, a first known data storage technique involves storing "raw" data—or data retaining all transactional and/or event details. As an ongoing example utilized for comparison herein, assume that data to be stored represents transactions or events occurring every second over a five (5) year period of time. For purposes of example only, such data may represent theoretical wagers placed by an online wagering game player, once per second for five (5) years. In accordance with the first known data storage technique represented by a first graph 100a in FIG. 1A, each transaction may simply be stored. As depicted by the first graph 100a, such a technique results in steadily increasing memory demands as time progresses. Specifically, if a value for each transaction/event is stored along with a respective time stamp, each item stored would require, for example, nine (9) bytes (e.g., one (1) byte for the value of the event and one long variable type of eight (8) bytes for the time stamp). Thus, for the one hundred and fifty-seven million, two hundred and forty-eight thousand (157,248,000) events over the five (5) year period (e.g., sixty (60) seconds×sixty (60) minutes×twenty-four (24) hours×seven (7) days (or one (1) week)×four (4) weeks (or one (1) month)×thirteen (13) months (thirteen (13) sets of four (4) weeks per year)×five (5) years), the data storage requirement would be equal to about one thousand three hundred and fifty megabytes (1,350 MB; e.g., one hundred and fifty-seven million, two hundred and forty-eight thousand (157,248,000) events× nine (9) bytes). This, of course, is representative of a set of events for any single account, wagerer, gamer, player, customer, or other entity. In the case that events for many thousands of accounts, customers, players, etc. are desired to be tracked, the data storage constraints quickly become difficult to manage and difficult to predict.

A common (or second known) data storage technique for addressing the large data burden for such frequent transactions/events for a large number of accounts, customer, players, etc., is to simply aggregate older data, as depicted by a second graph 100b in FIG. 1B. In such a technique, some level of data aggregation must be defined. At the most simple, for example, some amount of "raw" data may be stored, such as the previous twenty-four (24) hours of data, with all previous data being aggregated by day (e.g., the total value of all transactions for a particular player/account, per day). In some cases, a progressively less granular level of aggregation (or a tiered or hierarchical aggregation) may be utilized, such as for example, storing full or "raw" transaction data for each of the last sixty (60) seconds, storing data values aggregated to the minute for each of the last sixty (60) minutes, storing data values aggregated to the hour for each of the last twenty-four (24) hours, storing data values aggregated to the day for each of the last seven (7) days (e.g., one (1) week), storing data values aggregated to the week for each of the last four (4) weeks (e.g., one (1) month), storing data values aggregated to the month for each of the last thirteen (13) months, and storing data values aggregated to the year for each of the last four (4) years. As depicted by the second graph 100b in FIG. 1B, such a progressively reduced-granularity tiered aggregation approach greatly reduces the data storage burden, such as by requiring storage of only one hundred and seventy-two (172) data points (e.g., sixty (60) seconds+sixty (60) minutes+twenty-four (24) hours+seven (7) days+four (4) weeks+thirteen (13) months+ four (4) years) and respective time stamps, requiring approximately fifteen thousandths of a megabyte (0.015 MB; e.g., one hundred and seventy-two (172) data points× nine (9) bytes).

Figure 2A:
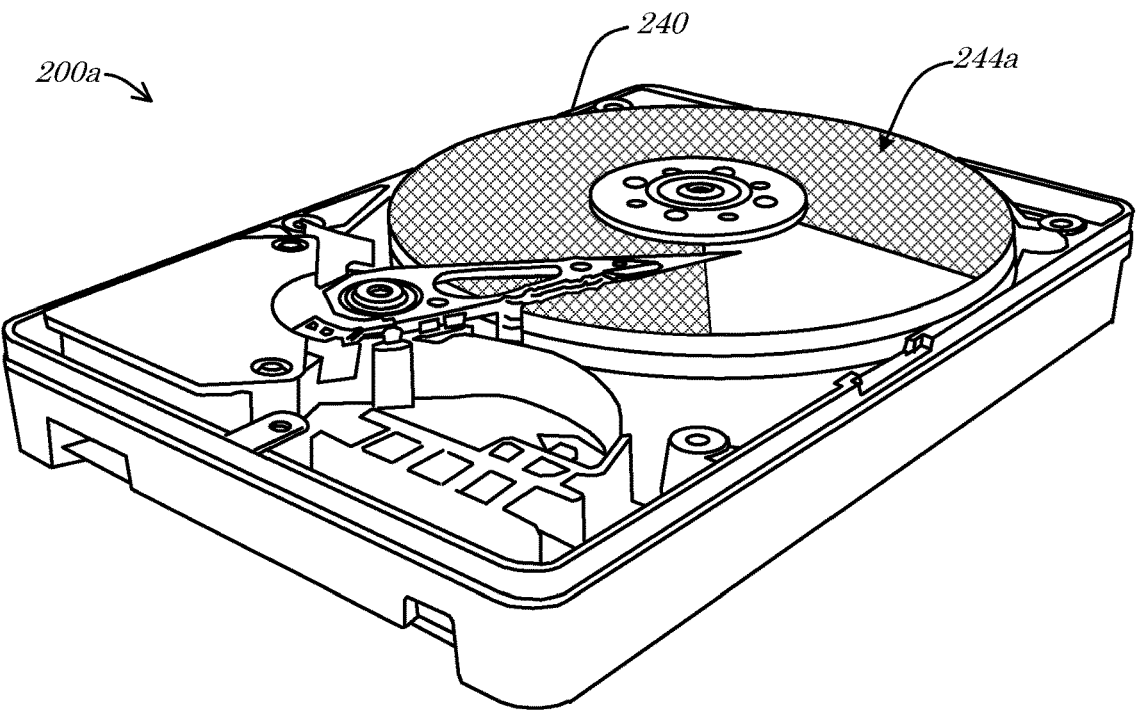
FIG. 2A and FIG. 2B are perspective diagrams of data storage scenarios in accordance with the prior art data storage techniques of FIG. 1A and FIG. 1B, respectively.

As depicted in FIG. 2A, a first data storage scenario 200a in accordance with the first data storage technique of FIG. 1A demands approximately eighty-seven percent (87%) of the space, represented by a first shaded "used" portion 244a, available on a one and a half gigabyte (1.5 GB) hard drive 240 (e.g., one thousand three hundred and fifty megabytes (1,350 MB) of one thousand five hundred and thirty six megabytes (1,536 MB)). In contrast, As depicted in FIG. 2B, a second data storage scenario 200b in accordance with the second data storage technique of FIG. 1B demands less than one thousandth of a percent (0.001%) of the space, represented by a second shaded "used" portion 244b, available on the one and a half gigabyte (1.5 GB) hard drive 240 (e.g., fifteen thousandths of a megabyte (0.015 MB) of one thousand five hundred and thirty six megabytes (1,536 MB)).

II. Optimized Long-Term Data Storage

Figure 2B:
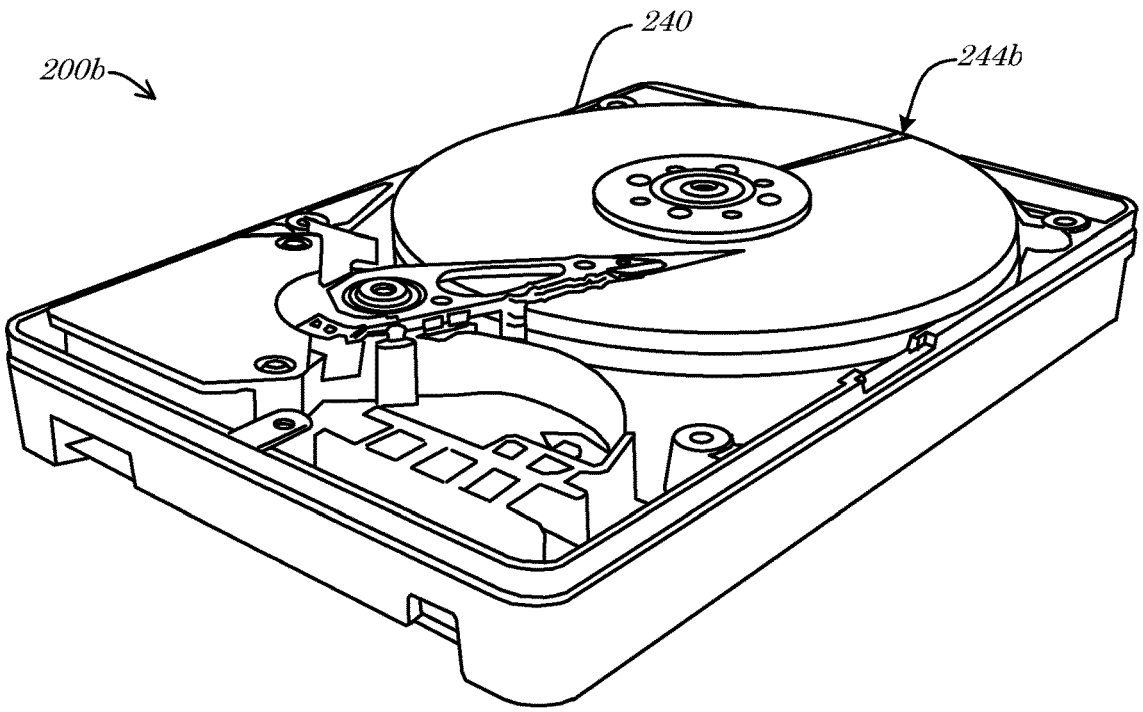

In many cases, the dramatic memory savings achieved via implementation of the second data storage technique depicted in FIG. 1B and FIG. 2B may readily be viewed as a solution to the problems presented by the first data storage technique depicted with respect to FIG. 1A and FIG. 2A. Data granularity, for example, may simply be adjusted by selecting aggregation tiers that best suit specific data analysis needs and available data storage constraints. Applicant has realized, however, that in some cases, great memory savings may still be achieved while also preserving (or predicting or modelling) characteristics of the underlying aggregated data for enhanced data analysis possibilities, e.g., without the need to adjust data aggregation granularity levels or tiers.

Applicant has realized, for example, that benefits in reduced storage space and discrete data value distributions may be simultaneously achieved by storing: (i) a value for an aggregated parameter for a specific macro time period (comprising multiple individual time periods), (ii) a value for the macro time period, and/or (iii) values descriptive of coefficients of a mathematical function representing the distribution of values across the individual time periods of the macro time period). To assist in explanation of the novel technique(s) for long-term data storage presented herein, reference is made to FIG. 3, in which an example graph 300 of a data storage technique according to some embodiments is shown. The example graph 300 depicts, for example, a method of aggregating long-term data (e.g., the same amount of data utilized for exemplary purposes with respect to FIG. 1A, FIG. 1B, FIG. 2A, and FIG. 2B herein) for storage while also maintaining a conceptualization of the details of the data for in-depth data analysis.

According to some embodiments, the thirty-nine million, three hundred and twelve thousand (39,312,000) events in the ongoing example may be aggregated in a manner similar to the second data storage technique described with respect to FIG. 1B and FIG. 2B, such that, for example, data values are aggregated to the minute for each of the last sixty (60) minutes, to the hour for each of the last twenty-four (24) hours, to the day for each of the last seven (7) days (e.g., one (1) week), to the week for each of the last four (4) weeks (e.g., one (1) month), to the month for each of the last thirteen (13) months, and to the year for each of the last four (4) years.

In some embodiments, for each level of aggregation at least one value of a mathematical coefficient is stored along with the value of the aggregation. According to some embodiments, values of coefficients from one level of aggregation prior to the current level (e.g., one level of higher granularity) may also be stored. In some embodiments, a value descriptive of time may also be stored—e.g., a timestamp. According to some embodiments, in the case that a current or base time is known, individual timestamp data need not be stored since each level of aggregation is temporally capable of being referenced from the current or base time. In the case that the current second is known, for example, the previous sixty (60) seconds may readily be derived without needing to be stored.

In some embodiments, and as depicted in the example graph 300 and in accordance with the ongoing example of tiered aggregation levels herein, the novel data storage technique may accordingly require storage of: (i) a value for each event in the last sixty (60) seconds requiring sixty (60) bytes (e.g., sixty (60) values at, for example, one (1) byte a piece); (ii) an aggregated value for each minute in the last sixty (60) minutes as well as, for example, six (6) coefficients for each minute of the last sixty (60) minutes, corresponding to a six (6) degree polynomial representative of the distribution of the values comprising the aggregated value across each minute, requiring two thousand nine hundred and forty (2,940) bytes (e.g., sixty (60) values at, for example, one (1) byte a piece, as well as values for the six (6) coefficients at, for example, eight (8) bytes a piece, for a total of forty-nine (49) bytes per minute); (iii) an aggregated value for each hour in the last twenty-four (24) hours as well as, for example, six (6) coefficients for each hour of the last twenty-four (24) hours, corresponding to a six (6) degree polynomial representative of the distribution of the values comprising the aggregated value across each hour, plus the six (6) coefficients for each aggregated time period (e.g., each minute) within each hour (e.g., from the previous level of granularity), requiring seventy thousand three hundred and twenty (70,320) bytes (e.g., twenty-four (24) values at, for example, two (2) bytes a piece (e.g., as the aggregated values are increasing in size), as well as values for the six (6) coefficients at, for example, eight (8) bytes a piece, plus the six (6) coefficients for each minute time period within each hour at eight (8) bytes a piece, for a total of two thousand nine hundred and thirty (2,930) bytes per hour); (iv) an aggregated value for each day in the last seven (7) days as well as, for example, six (6) coefficients for each day of the last seven (7) days, corresponding to a six (6) degree polynomial representative of the distribution of the values comprising the aggregated value across each day, plus the six (6) coefficients for each aggregated time period (e.g., each hour) within each day (e.g., from the previous level of granularity), requiring eight thousand four hundred and fourteen (8,414) bytes (e.g., seven (7) values at, for example, two (2) bytes a piece, as well as values for the six (6) coefficients at, for example, eight (8) bytes a piece, plus the six (6) coefficients for each hour time period within each day at eight (8) bytes a piece, for a total of one thousand two hundred and two (1,202) bytes per day); (v) an aggregated value for each week (e.g., a seven (7) day period) in the last four (4) weeks as well as, for example, six (6) coefficients for each week of the last four (4) weeks, corresponding to a six (6) degree polynomial representative of the distribution of the values comprising the aggregated value across each week, plus the six (6) coefficients for each aggregated time period (e.g., each day) within each week (e.g., from the previous level of granularity), requiring one thousand five hundred and forty-four (1,544) bytes (e.g., four (4) values at, for example, two (2) bytes a piece, as well as values for the six (6) coefficients at, for example, eight (8) bytes a piece, plus the six (6) coefficients for each day time period within each week at eight (8) bytes a piece, for a total of three hundred and eighty-six (386) bytes per week); (vi) an aggregated value for each month (e.g., a four (4) week time period) in the last thirteen (13) months as well as, for example, six (6) coefficients for each month of the last thirteen (13) months, corresponding to a six (6) degree polynomial representative of the distribution of the values comprising the aggregated value across each month, plus the six (6) coefficients for each aggregated time period (e.g., each week) within each month (e.g., from the previous level of granularity), requiring three thousand one hundred and forty-six (3,146) bytes (e.g., thirteen (13) values at, for example, two (2) bytes a piece, as well as values for the six (6) coefficients at, for example, eight (8) bytes a piece, plus the six (6) coefficients for each week time period within each month at eight (8) bytes a piece, for a total of two hundred and forty-two (242) bytes per month); and/or (vii) an aggregated value for each year (e.g., a thirteen (13) week time period) in the last four (4) years as well as, for example, six (6) coefficients for each year of the last four (4) years, corresponding to a six (6) degree polynomial representative of the distribution of the values comprising the aggregated value across each year, plus the six (6) coefficients for each aggregated time period (e.g., each month) within each year (e.g., from the previous level of granularity), requiring two thousand six hundred and ninety-six (2,696) bytes (e.g., four (4) values at, for example, two (2) bytes a piece, as well as values for the six (6) coefficients at, for example, eight (8) bytes a piece, plus the six (6) coefficients for each month time period within each year at eight (8) bytes a piece, for a total of six hundred and seventy-four (674) bytes per year). In some embodiments, the novel data storage technique may also store appropriate values representing an "all-time" or "inception-to-date" (e.g., complete) time period, e.g., that stores a value for a particular event aggregated over all available time periods, as well as data descriptive of a mathematical function representing the distribution of values across and/or through the complete time period. According to some embodiments, the novel data storage technique may also or alternatively store appropriate values representing an "all-time-since" time period, e.g., that stores a value for a particular event aggregated over all available time periods since a particular date/time, as well as data descriptive of a mathematical function representing the distribution of values across and/or through the all-time-since time period.

In this specific, non-limiting, and ongoing example, the data storage technique disclosed herein would accordingly require approximately eighty-five thousandths of a megabyte (0.085 MB) of storage space. Thus, in some embodiments, the storage space required for a given set of long-term (or other high-volume) data may be reduced by nearly sixteen thousand (16,000) times as compared to the first data storage technique of FIG. 1A and FIG. 2A. The present data storage technique does indeed require more storage space (nearly six (6) times as more) than the second data storage technique of FIG. 1B and FIG. 2B, but provides for a maintaining of data granularity or details (e.g., distributions over sub-time periods as expressed by one or more mathematical functions) in a manner that preserves the ability to perform detailed data analysis—which the second data storage technique does not.

Figure 3:
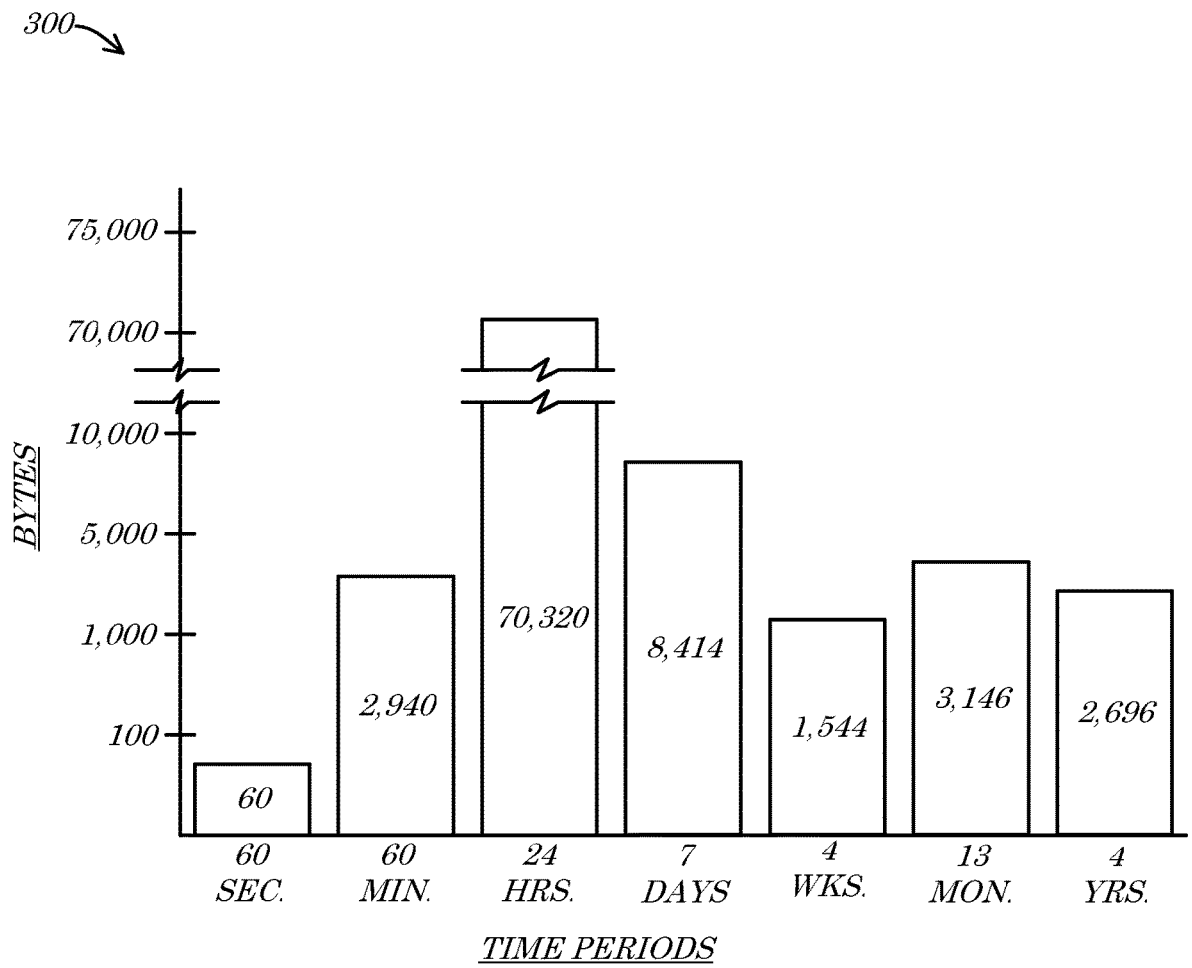
FIG. 3 is a graph of a data storage technique according to some embodiments.
Figure 4A:
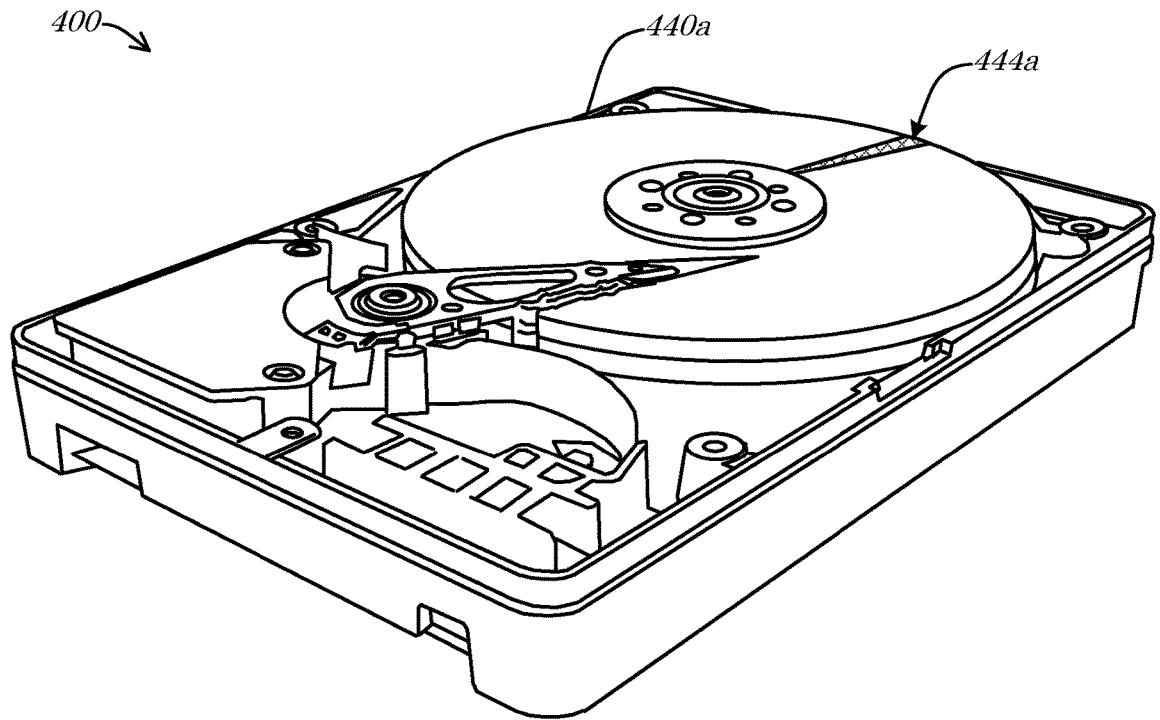
FIG. 4A and FIG. 4B are perspective diagrams and data storage structure diagrams, respectively, of a data storage scenario in accordance with the data storage technique of FIG. 3.
Figure 4B:
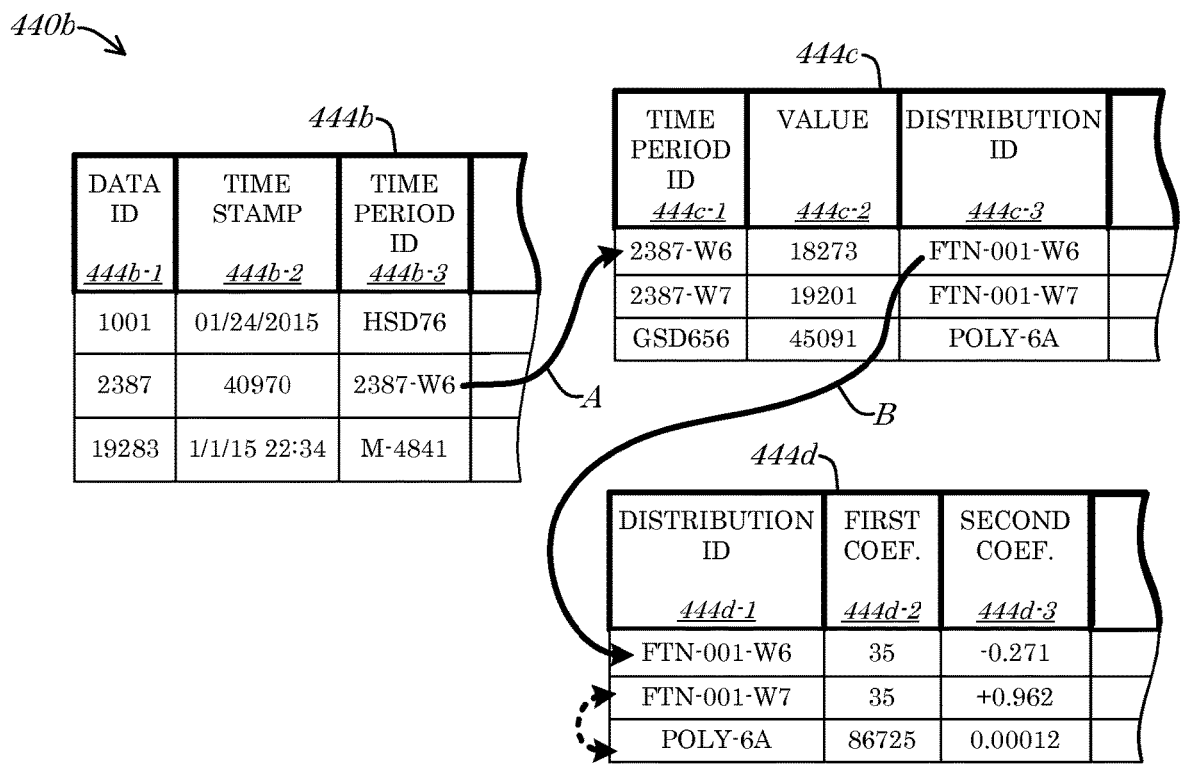

As depicted in FIG. 4A and FIG. 4B, a novel data storage scenario 400 in accordance with the novel data storage technique of FIG. 3 as described herein, may be associated with one or more data storage structures 440a-b. As depicted in FIG. 4A, a first data storage structure 440a may comprise a hard drive (or other electronic and/or magnetic data storage device) such as a five hundred megabyte (500 MB) hard drive 440a. In some embodiments, the novel data storage scenario 400 in accordance with the novel data storage technique of FIG. 3 may demand approximately six thousandths of a percent (0.006%) of the space, represented by the shaded "used" data portion 444a, available on the one and a half gigabyte (1.5 GB) hard drive 440a. As depicted in FIG. 4B, the novel data storage scenario 400 in accordance with the novel data storage technique of FIG. 3 may be implemented utilizing a second data storage structure 440b. In some embodiments, second data storage structure 440b may reside on the hard drive 440a and/or may comprise and/or define the "used" portion 444a of the hard drive 440a.

In some embodiments, the second data storage structure 440b may comprise a plurality of data tables (or other memory storage structures, not necessarily limited to relational database applications) such as a time stamp table 444b, a time period table 444c, and/or a data distribution table 444d. The data tables 444b-d may, for example, be utilized in an execution of a data analysis procedure with respect to long-term, time-based, and/or other high-volume discrete data elements stored on the hard drive 440a. In accordance with the non-limiting example utilized herein, for example, the hard drive 440a may store the second data storage structure 440b in the used data portion 444a which in turn stores a large set of historic transactional data such as data descriptive of gaming and/or wagering activities of at least one online game player.

The time stamp table 444b may comprise, in accordance with some embodiments, a data IDentifier (ID) field 444b-1, a time stamp field 444b-2, and/or a time period ID field 444b-3. Any or all of the ID fields 444b-1, 444b-3 may generally store any type of identifier that is or becomes desirable or practicable (e.g., a unique identifier, an alpha-numeric identifier, and/or an encoded identifier). According to some embodiments, the data ID field 444b-1 may store an identifier associated with a particular account, player, customer, etc. In some embodiments, the time stamp field 444b-2 may store data descriptive of a particular time and/or date, in any format as is or becomes desired or practicable. According to some embodiments, the time period ID field 444b-3 may store data that links a particular account and/or player to a plurality of historic data aggregation and/or granularity levels.

The time period table 444c may comprise, in accordance with some embodiments, a time period ID field 444c-1, a value field 444c-2, and/or a distribution ID field 444c-3. In the case that the given time period(s) is not aggregated, such as in the case that "raw" data is stored for each second for the last sixty (60) seconds, the value field 444c-2 may store an actual discrete value representative of a particular transaction and/or event that occurred (e.g., a value of a particular wager, a login event for a particular account/user-ID, etc.), for example, at a particular second. In the case that a given time period or level of granularity is "macro" in nature (e.g., comprises data aggregation sub-levels), such as an aggregation for a particular day's worth of data as some point in time, the value field 444c-2 may store the aggregated data value (e.g., a total number or value of wagers submitted during the particular day). In some embodiments, the distribution ID field 444c-3 may store data that links a particular time-based aggregation or granularity level to a mathematical representation of how the pre-aggregated values were distributed over or across, for example, the particular day.

The data distribution table 444d may comprise, in accordance with some embodiments, a distribution ID field 444d-1, a first coefficient field 444d-2, and/or a second coefficient field 444d-3. According to some embodiments, the first coefficient field 444d-2 and/or the second coefficient field 444d-3 may store data associated with a particular mathematical function or equation that is descriptive of aggregated data distributions. While only two coefficient fields 444*d*-2, 444*d*-3 are depicted in FIG. 4B, in some cases fewer or more coefficients and/or associated fields may be utilized. In accordance with the ongoing and non-limiting example, for example, in the case that a six (6) degree polynomial function is utilized to model, predict, and/or represent aggregated data distributions (e.g., pre-aggregation), six (6) coefficients and associated fields may be utilized.

In some embodiments, large amounts of data such as long-term time-based data may be analyzed (e.g., in a manner that reduces data storage requirements and/or increases analysis processing speeds relative to previous data storage techniques) utilizing relationships established between two or more of the data tables 444*b-d* (and/or between one or more of the fields or records thereof). As depicted in the example second data storage structure 440*b* of FIG. 4B, for example, a first relationship "A" may be established between the time stamp table 444*b* and the time period table 444*c*. In some embodiments (e.g., as depicted in FIG. 4B), the first relationship "A" may be defined by utilizing the time period ID field 444*b*-3 as a data key linking to the time period ID field 444*c*-1. According to some embodiments, the first relationship "A" may comprise any type of data relationship that is or becomes desirable, such as a one-to-many, many-to-many, or many-to-one relationship. In the case that multiple time periods (e.g., levels of data aggregation and/or granularity) are stored with respect to any given timed stamp object or event, the first relationship "A" may comprise a one-to-many relationship. In such a manner, for example, a given account, player, entity, and/or customer may be readily analyzed with respect to a plurality of time periods for which event/transaction data exists.

According to some embodiments, a second relationship "B" may be established between the time period table 444*c* and the data distribution table 444*d*. In some embodiments (e.g., as depicted in FIG. 4B), the second relationship "B" may be defined by utilizing the distribution ID field 444*c*-3 as a data key linking to the distribution ID field 444*d*-1. According to some embodiments, the second relationship "B" may comprise any type of data relationship that is or becomes desirable, such as a one-to-many, many-to-many, or many-to-one relationship. In the case that a plurality of mathematical coefficients are stored to represent the data distribution over or across any given time period, the second relationship "B" may comprise a one-to-many relationship. In such a manner, for example, not only may the customer/player/entity's data be analyzed in an aggregated historic time period context, but the aggregation of such data to save memory resources does not substantially impede detailed analysis of data distributions even for many of the aggregated time periods.

In some embodiments, relationships may exist between and/or amongst two or more data records. Any particular distribution ID stored in the distribution ID field 444*d*-1, for example, may be related to one or more other distribution ID records. Such relationship(s) may be identified in various manners (e.g., as represented by the dotted line in FIG. 4B) such as utilizing data pointers, via one or more additional fields (not shown), etc. In such a manner, for example, related data distributions may permit data analysis activities at various "drill-down" levels within the data. Increased relational granularity of related time periods may be explored to allow more detailed data analysis, while maintaining high levels of data storage savings.

According to some embodiments, fewer or more data fields than are shown may be associated with the data tables 444*b-d*. Only a portion of one or more databases and/or other data stores is necessarily shown in FIG. 4A and/or FIG. 4B, for example, and other database and/or memory fields, columns, structures, orientations, quantities, and/or configurations may be utilized without deviating from the scope of some embodiments. Further, the data shown in the various data fields is provided solely for exemplary and illustrative purposes and does not limit the scope of embodiments described herein.

Applicant has realized that the novel long-term (or other high-volume) data storage technique described herein may be utilized to store large amounts of time-based data in a compact manner that also preserves an ability to perform detailed data distribution analysis. Thus, by utilizing or employing such a novel technique available memory resources may be utilized more efficiently and/or fewer such resources may be required to execute data analysis procedures. Further, reducing the number of memory access calls by employing the mathematically-represented or modelled data distributions over aggregated time periods may provide for faster process execution times (e.g., by reducing the communications bandwidth and/or attendant processing load required for data analysis procedures).

III. Processes

Figure 5:
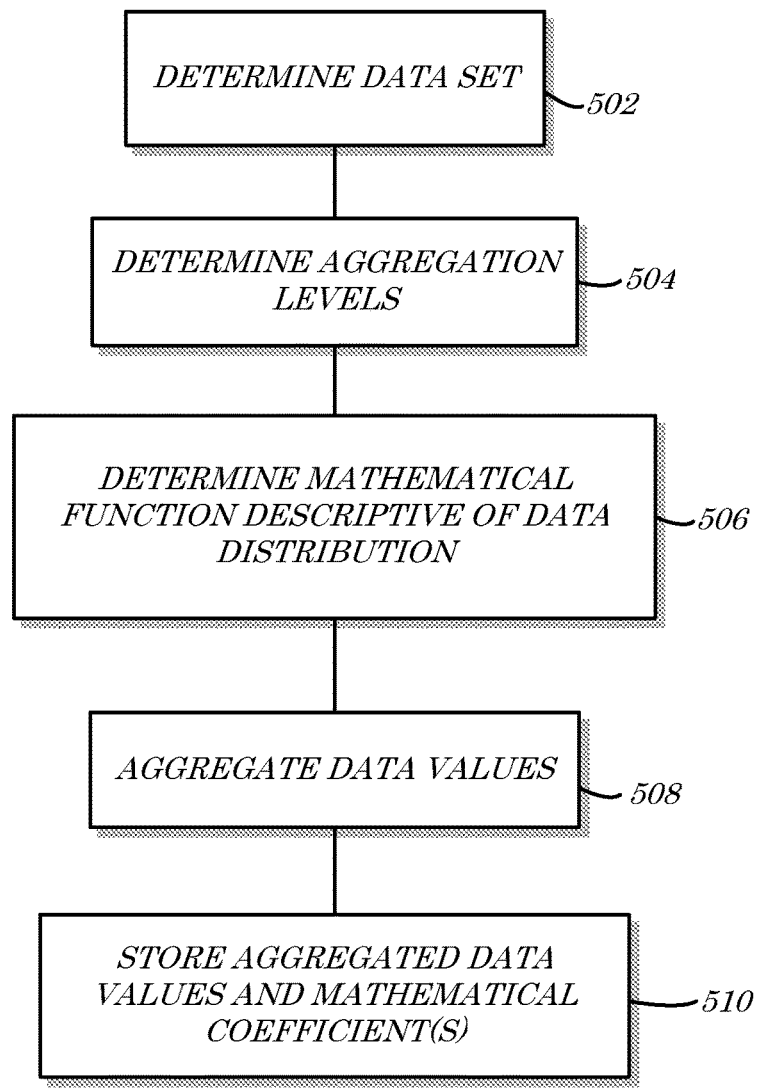
FIG. 5 is a flow diagram of a method according to some embodiments.

Turning now to FIG. 5, a flow diagram of a method 500 according to some embodiments is shown. In some embodiments, the method 500 may be performed and/or implemented by and/or otherwise associated with one or more specialized and/or computerized processing devices, specialized computers, computer terminals, computer servers, computer systems and/or networks, and/or any combinations thereof (e.g., by one or more online gaming company and/or online gaming player data analysis devices). In some embodiments, the method 500 may be embodied in, facilitated by, and/or otherwise associated with various input mechanisms and/or interfaces. In some embodiments, the method 500 may be implemented in conjunction and/or association with execution of one or more data analysis procedures that utilize long-term (or other high-volume) data sets, e.g., as described herein.

The process and/or flow diagrams described herein do not necessarily imply a fixed order to any depicted actions, steps, and/or procedures, and embodiments may generally be performed in any order that is practicable unless otherwise and specifically noted. While generally not limiting with respect to order and/or timing, in some embodiments, the presented methods and processes may be specifically limited to and/or structured in accordance with any depicted and/or described order, hierarchy, timing, etc. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video/Versatile Disk (DVD)) may store thereon instructions that when executed by a machine (such as a computerized processing device) result in performance according to any one or more of the embodiments described herein.

In some embodiments, the method 500 may comprise determining (e.g., by a central server device and/or specially-programmed processing device) a set of data, at 502. In the case that the method 500 is utilized as an on-going, transactional, and/or real-time data storage technique to process incoming (e.g., based on received input, such as from an online game player) data, for example, the data set may comprise data descriptive of real-time events as they occur—e.g., upon each online wager event occurring or in blocks of data, such as at the conclusion of any particular game session. In the case that the method 500 is utilized to convert or transform pre-existing historic data into a different storage configuration in accordance with the data storage technique(s) described herein, blocks, chunks, sectors, and/or other measures or objects of pre-existing data storage may be accessed and/or retrieved (e.g., downloaded and/or moved) from one or more data storage devices. In some embodiments, the set of data may comprise network and/or communications traffic or packets that are received, sent, and/or relayed by one or more network devices. A router or other network device (e.g., either of which may be specially-programmed to perform in accordance with embodiments described herein) may, for example, determine and/or capture data handled by such network device.

According to some embodiments, the method 500 may comprise determining (e.g., by the central server device and/or specially-programmed processing device) a plurality of levels of time-based granularity, at 504. In accordance with the ongoing example herein, for example, it may be determined that data should be aggregated in accordance with different time-based levels or periods such as to the minute for each of the last sixty (60) minutes, to the hour for each of the last twenty-four (24) hours, to the day for each of the last seven (7) days (e.g., one (1) week), to the week for each of the last four (4) weeks (e.g., one (1) month), to the month for each of the last thirteen (13) months, to the year for each of the last four (4) years, and/or an "all-time" level aggregated over an entire available time range. While these data aggregation and/or granularity levels are exemplary and non-limiting with respect to some embodiments herein, they are believed to be useful in certain applications such as for representing large volumes of event and/or transactional data occurring with respect to line gaming, and accordingly some embodiments include such specific time-based data aggregation levels. According to some embodiments, the applicable aggregation levels may be dynamic and/or based on current resource levels and/or characteristics of the account, player, etc. for which the data is being stored. Accounts and/or players determined to be of lower value or perceived value, for example, may warrant higher levels of data aggregation (such as only storing minute-level details for the last five (5) minutes, as opposed to the last sixty (60) minutes) and accordingly less preserved "raw" data and/or data details, while higher-value (e.g., more active, those designated as VIPs) players may warrant more detailed data preservation and lower levels of aggregation (e.g., storing day-level data going back three (3) months, as opposed to just for the last seven (7) days).

In some embodiments, the method 500 may comprise determining (e.g., by the central server device and/or specially-programmed processing device), for each level of time-based granularity, a mathematical function descriptive of a distribution of values across a respective time period, at 506. The data for any given time period, such as for a particular day for example, may be analyzed to determine a mathematical function that best fits the distribution of individual data values within the time period. The distribution of twenty-four (24) hours of data points over a particular day-long time period, for example, may be analyzed and/or modelled to derive a mathematical function that represents the observed distribution. According to some embodiments, a pre-determined function may be utilized and the particular values of the function's coefficients may be determined for a particular distribution. In the ongoing example herein, for example, a six (6) degree polynomial may be utilized to describe data distribution for a particular variable over a particular time-period and values for each of the six (6) coefficients of the function may be determined for a particular data set (e.g., the data set determined and/or received at 502).

According to some embodiments, the method 500 may comprise aggregating (e.g., by the central server device and/or specially-programmed processing device), for each level of time-based granularity, data values for each respective time period, at 508. Data values for each time-period may be summed, for example, to save data storage resources. In some embodiments however, as the determining of the mathematical function at 506 may occur prior to the aggregating at 508, data descriptive of the pre-aggregation distribution of data values may be preserved. The aggregation at 508 may occur, for example, in response to and/or after the determining at 506. In the case that data continues to be received and/or input (e.g., as a stream of data descriptive of ongoing events), the determining of the function at 506 and/or the aggregation at 508 may occur repetitively, e.g., as needed to meet the requirements of the time-based data aggregation levels.

In some embodiments, the method 500 may comprise storing (e.g., by the central server device and/or specially-programmed processing device), for each level of time-based granularity, data descriptive of (i) the aggregated value and (ii) values for one or more coefficients of the mathematical function, at 510. As opposed to the previous data storage techniques described with reference to FIG. 1A, FIG. 1B, FIG. 2A, and FIG. 2B herein, for example, not only may data values be aggregated (e.g., "rolled-up"), but details of the original data distribution which would otherwise be lost due to the aggregation, are preserved in a manner that maintains an advantage of data storage space savings. The mathematical function and corresponding saved coefficient values, for example, may be utilized to model, predict, reconstruct, and/or otherwise analyze the pre-aggregation data distribution patterns for transactions and/or events that have occurred. In some embodiments, such as in the specific version of the ongoing example described with respect to FIG. 3 herein, data descriptive of one or more coefficients for a mathematical function (and/or the function itself) may be stored with respect to a previous level of granularity as well. In the case of storing aggregated data for each hour over the last twenty-four (24) hours, for example, not only may the twenty-four (24) aggregated values be stored, and not only may one or more (e.g., six (6)) coefficients representing how the aggregated data was originally distributed within each aggregated hour time period be stored, but one or more (e.g., six (6)) coefficients representing how the aggregated data for each minute (that was utilized to produce each given hour's aggregation value) was originally distributed within each aggregated minute sub-time period may be stored as well (e.g., in relation to the data stored with respect to each hour for the last twenty-four (24) hours). In some embodiments, such as depicted in the example second data storage structure 440b of FIG. 4B herein, additional data storage space savings may be achieved by storing a single time stamp or other time-indicative value for each particular record (e.g., account or player), where the time stamps or time data for each time period may be derived due to a pre-known correspondence of the time-based aggregation and/or granularity levels.

In some embodiments, the method 500 may comprise a method of converting data stored in accordance with one or more other data storage techniques to data stored in accordance with the novel technique(s) as described herein. An existing data set of "raw" transactional data may, for example, be processed by the method 500 (or a portion thereof) to convert a "raw" data storage structure to the format and structure defined herein. According to some embodiments, a newly-defined data storage structure may be directly saved and/or defined utilizing methods of storing data as described herein. In some embodiments, once the data storage structure is stored or constructed in the new format, the data storage structure may be queried (e.g., in a manner that requires fewer data processing resources than previous methods) such as to perform data analysis on a particular player's wagering or game play history.

IV. Systems

Figure 6:
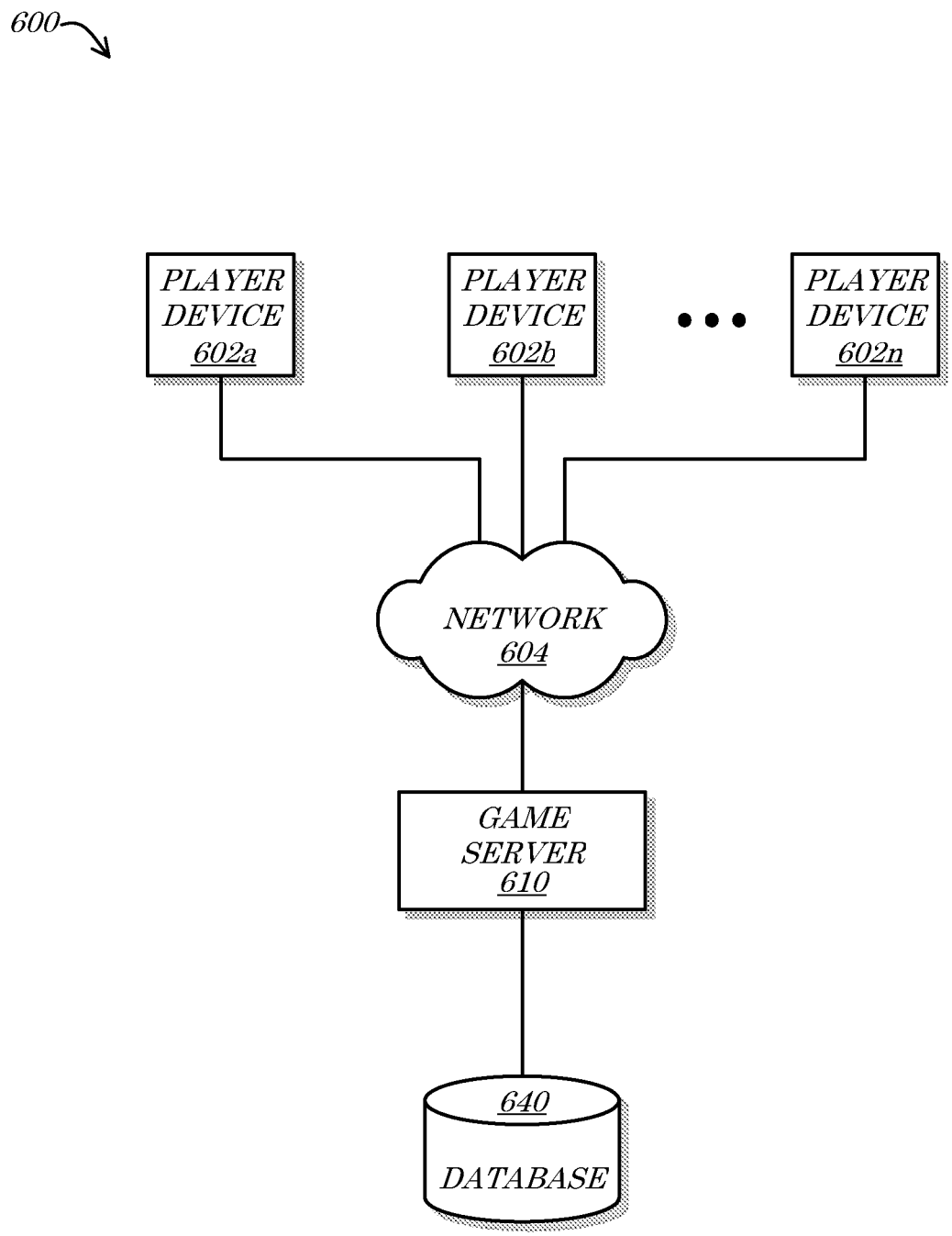
FIG. 6 is a block diagram of a system according to some embodiments.

Referring now to FIG. 6, a block diagram of a system 600 according to some embodiments is shown. In some embodiments, the system 600 may comprise a gaming platform such as a gaming platform via which one or more multi-player and/or online games may be played. In some embodiments, the system 600 may comprise a plurality of player devices 602*a-n* in communication with and/or via a network 604. In some embodiments, a game server 610 may be in communication with the network 604 and/or one or more of the player devices 602*a-n*. In some embodiments, the game server 610 (and/or the player devices 602*a-n*) may be in communication with a database 640. The database 640 may store, for example, game data (e.g., processed and/or defined by the game server 610), data associated with players (not explicitly shown) owning and/or operating the player devices 602*a-n*, and/or instructions that cause various devices (e.g., the game server 610 and/or the player devices 102*a-n*) to operate in accordance with embodiments described herein. The database 640 may store, for example, large volumes of transactional data in a lossy compression format (e.g., stored aggregates plus mathematical modelling of pre-aggregation data distribution) as described herein and/or may permit enhanced access or querying of the data stored therein, such as to permit the game server 610 to perform and/or execute one or more analytical models or other algorithms (e.g., in a manner requiring less data storage space and/or having increased execution speeds compared to typical systems). In some embodiments, the database 640 may also or alternatively comprise one or more different memory types such as application operational memory (e.g., RAM or cache) utilized to execute analytical models based on stored long-term data as described herein.

According to some embodiments, any or all of the components 602*a-n*, 604, 610, 640 of the system 600 may be similar in configuration and/or functionality to any similarly named and/or numbered components described herein. Fewer or more components 602*a-n*, 604, 610, 640 (and/or portions thereof) and/or various configurations of the components 602*a-n*, 604, 610, 640 may be included in the system 600 without deviating from the scope of embodiments described herein. While multiple instances of some components 602*a-n* are depicted and while single instances of other components 604, 610, 640 are depicted, for example, any component 602*a-n*, 604, 610, 640 depicted in the system 600 may comprise a single device, a combination of devices and/or components 602*a-n*, 604, 610, 640, and/or a plurality of devices, as is or becomes desirable and/or practicable. Similarly, in some embodiments, one or more of the various components 602*a-n*, 604, 610, 640 may not be needed and/or desired in the system 600.

The player devices 602*a-n*, in some embodiments, may comprise any type or configuration of electronic, mobile electronic, and or other network and/or communication devices (or combinations thereof) that are or become known or practicable. A first player device 602*a* may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 602*a-n* may be specifically utilized and/or configured (e.g., via specially-programmed and/or stored instructions such as may define or comprise a software application) to communicate with the game server 610 (e.g., via the network 604).

The network 604 may, according to some embodiments, comprise a LAN, WAN, cellular telephone network, Bluetooth® network, NFC network, and/or RF network with communication links between the player devices 602*a-n*, the game server 610, and/or the database 640. In some embodiments, the network 604 may comprise direct communications links between any or all of the components 602*a-n*, 610, 640 of the system 600. The game server 610 may, for example, be directly interfaced or connected to the database 640 via one or more wires, cables, wireless links, and/or other network components, such network components (e.g., communication links) comprising portions of the network 604. In some embodiments, the network 604 may comprise one or many other links or network components other than those depicted in FIG. 6. A second player device 602*b* may, for example, be connected to the game server 610 via various cell towers, routers, repeaters, ports, switches, and/or other network components that comprise the Internet and/or a cellular telephone (and/or Public Switched Telephone Network (PSTN)) network, and which comprise portions of the network 604.

While the network 604 is depicted in FIG. 6 as a single object, the network 604 may comprise any number, type, and/or configuration of networks that is or becomes known or practicable. According to some embodiments, the network 604 may comprise a conglomeration of different sub-networks and/or network components interconnected, directly or indirectly, by the components 602*a-n*, 610, 640 of the system 600. The network 604 may comprise one or more cellular telephone networks with communication links between the player devices 602*a-n* and the game server 610, for example, and/or may comprise the Internet, with communication links between the player devices 602*a-n* and the database 640, for example.

According to some embodiments, the game server 610 may comprise a device (and/or system) owned and/or operated by or on behalf of or for the benefit of a gaming entity (not explicitly shown). The gaming entity may utilize player and/or game information or instructions (e.g., stored by the database 640), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 6) to and/or via the player devices 602*a-n*. The interface may be configured, according to some embodiments, to allow and/or facilitate electronic game play by one or more players. In some embodiments, the system 600 (and/or interface provided by the game server 610) may present game data (e.g., from the database 640) in such a manner that allows players to participate in one or more online games (singularly, in/with groups, and/or otherwise). According to some embodiments, the game server 610 may execute and/or facilitate one or analytical model processes by accessing event and/or transactional data stored in accordance with the novel data storage technique(s) and/or structure(s) described herein. According to some embodiments, the game server 610 may also or alternatively comprise one or more other network devices configured to store data in accordance with embodiments described herein.

In some embodiments, the database 640 may comprise any type, configuration, and/or quantity of data storage devices that are or become known or practicable. The database 640 may, for example, comprise an array of optical and/or solid-state hard drives configured to store player and/or game data (e.g., wagering and/or other event data), and/or various operating instructions, drivers, analytical modelling algorithms and/or modules, data distribution mathematical functions and/or models, etc. While the database 640 is depicted as a stand-alone component of the system 600 in FIG. 6, the database 640 may comprise multiple components. In some embodiments, a multi-component database 640 may be distributed across various devices and/or may comprise remotely dispersed components. Any or all of the player devices 602*a*-*n* may comprise the database 640 or a portion thereof, for example, and/or the game server 610 may comprise the database 640 or a portion thereof.

V. Apparatus and Articles of Manufacture

Figure 7:
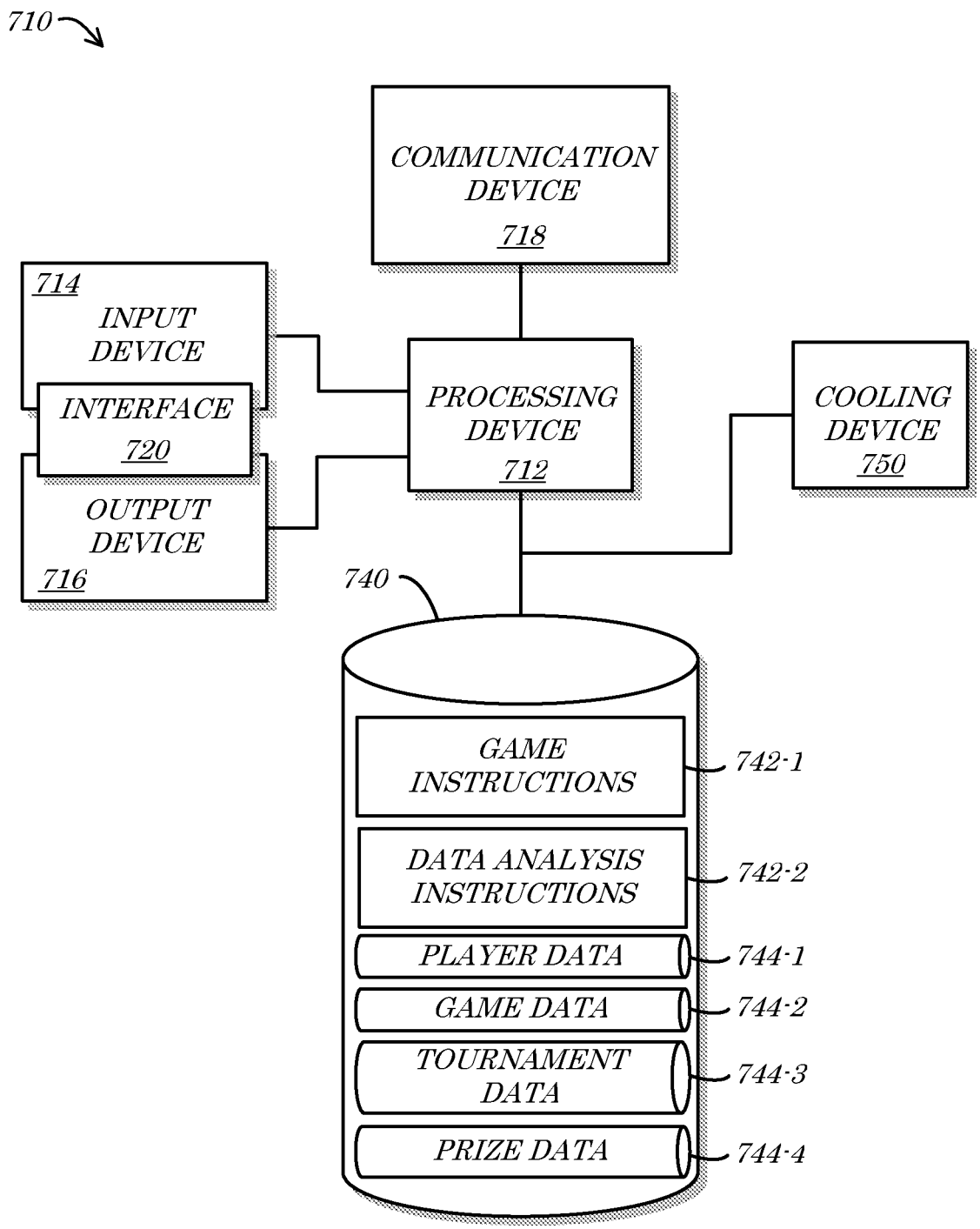
FIG. 7 is a block diagram of an apparatus according to some embodiments.
Figure 8A:
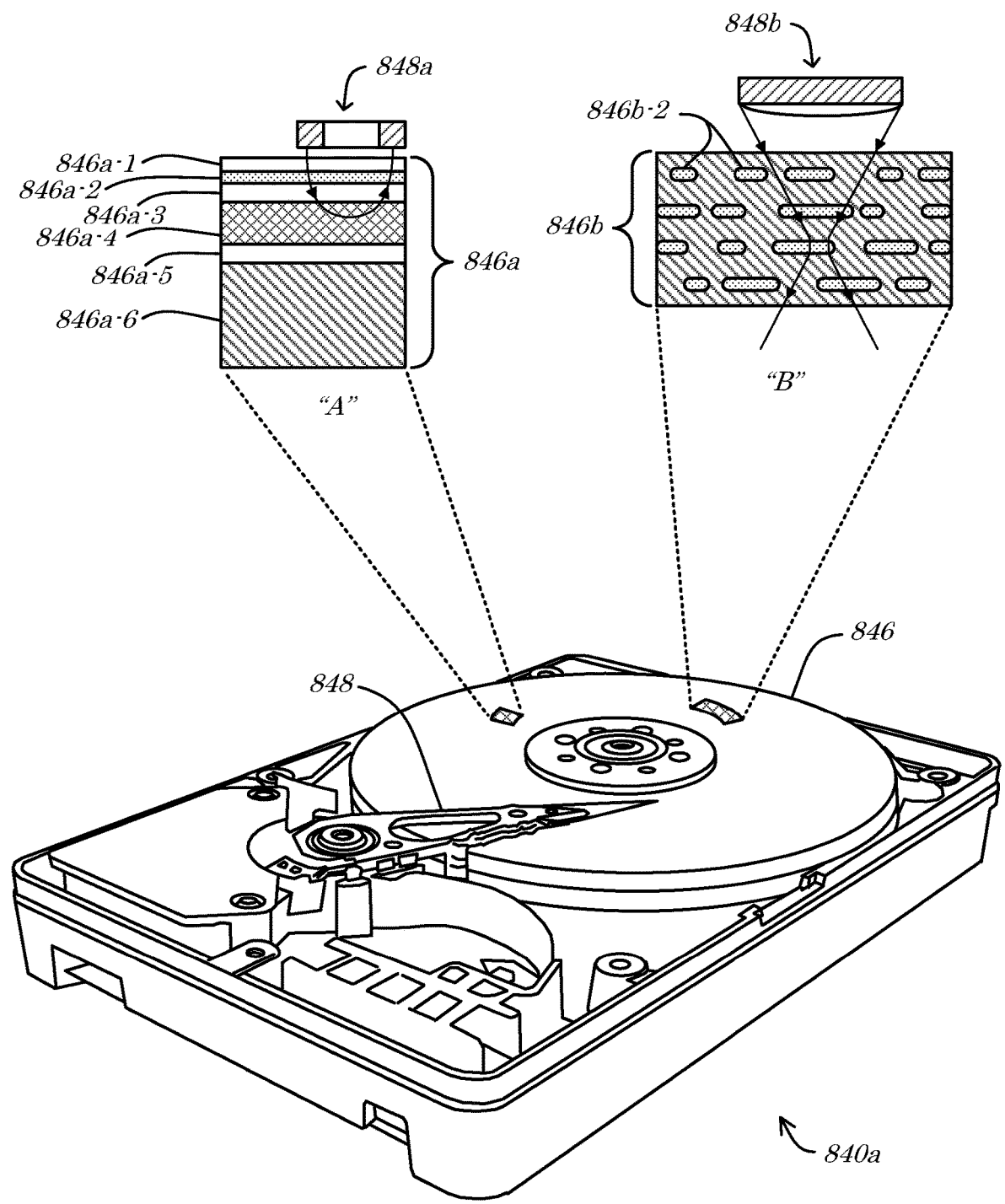
FIG. 8A, FIG. 8B, FIG. 8C, FIG. 8D, and FIG. 8E are perspective diagrams of exemplary data storage devices according to some embodiments.
Figure 8B:
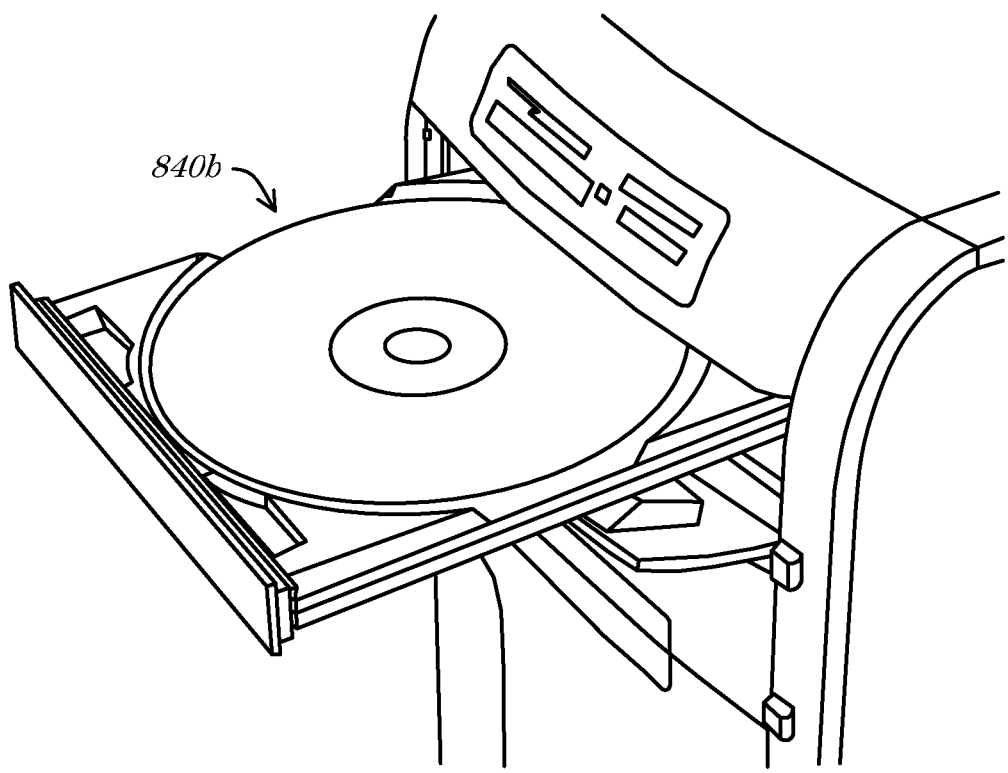
Figure 8C:
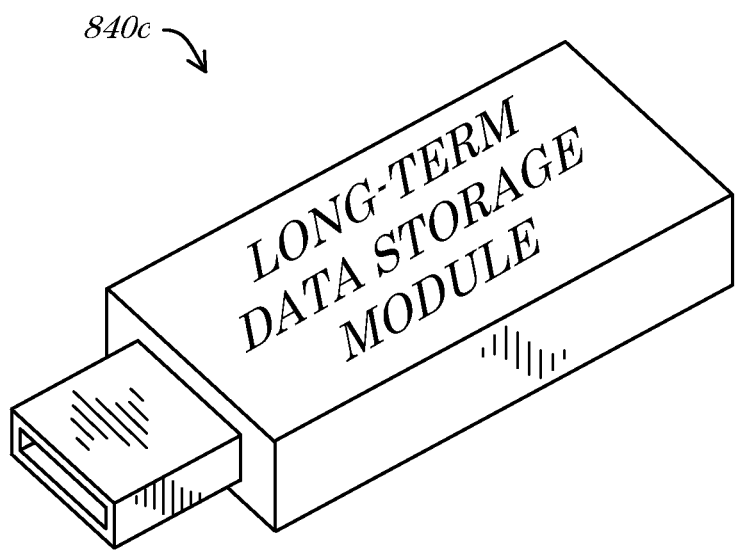
Figure 8D:
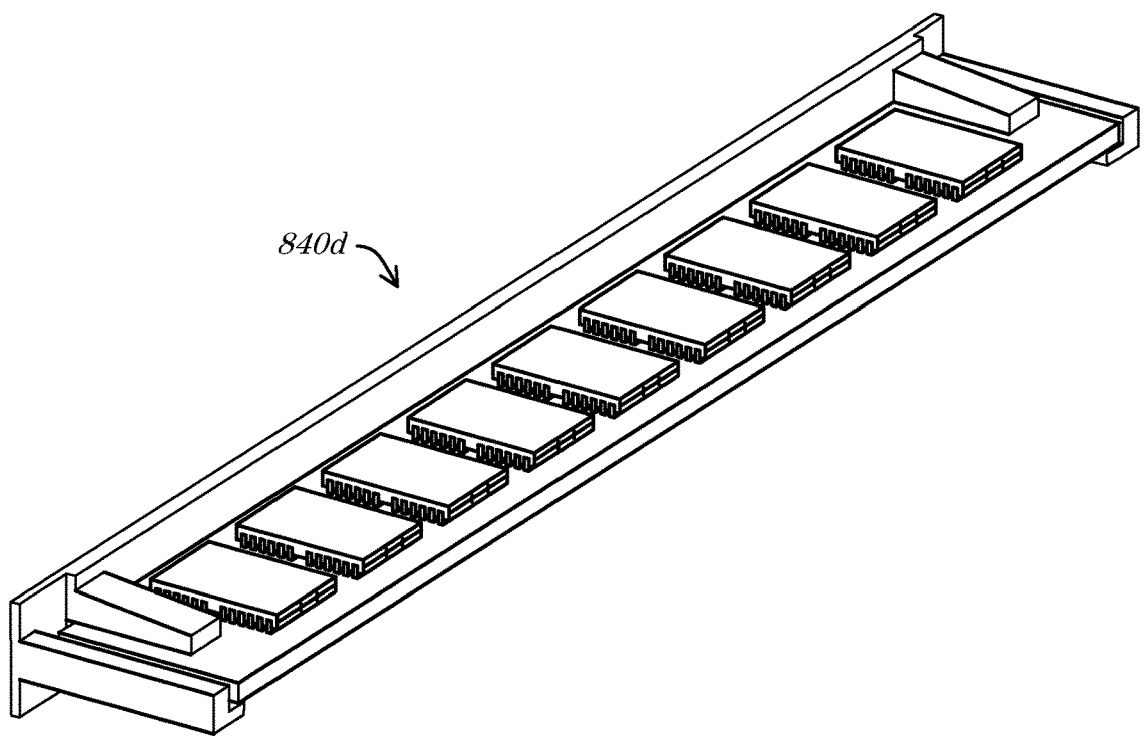
Figure 8E:
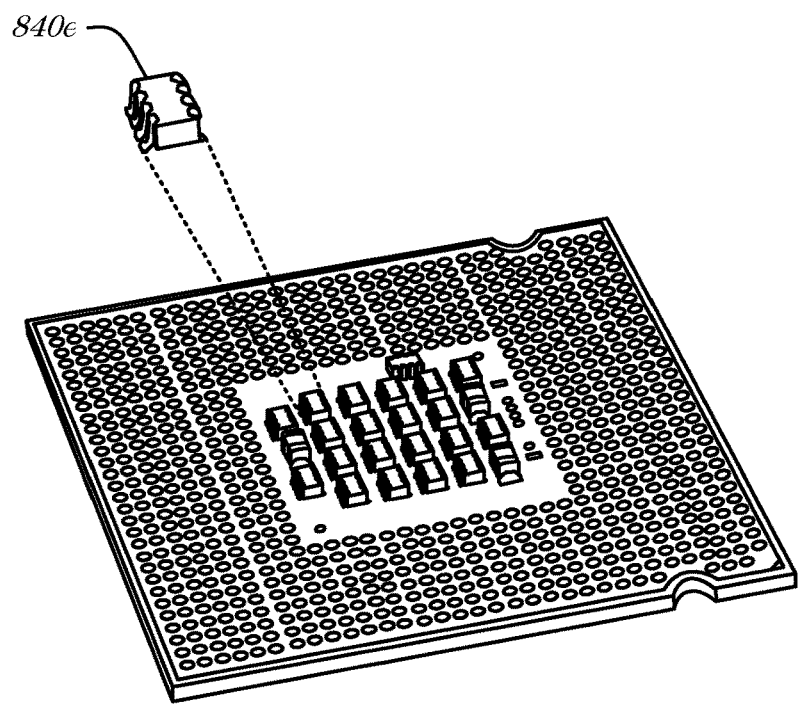

Turning to FIG. 7, a block diagram of an apparatus 710 according to some embodiments is shown. In some embodiments, the apparatus 710 may be similar in configuration and/or functionality to any of the player and/or user devices 602*a*-*n* and/or the servers 610 of FIG. 6 herein, and/or may otherwise comprise a portion of the system 600 of FIG. 6 herein. The apparatus 710 may, for example, comprise a network device that may execute, process, facilitate, and/or otherwise be associated with the method 500 described in conjunction with FIG. 5 herein, and/or one or more portions thereof. In some embodiments, the apparatus 710 may comprise a processing device 712, an input device 714, an output device 716, a communication device 718, an interface 720, a memory device 740 (storing various programs and/or instructions 742 and data 744), and/or a cooling device 750. According to some embodiments, any or all of the components 712, 714, 716, 718, 720, 740, 742, 744, 750 of the apparatus 710 may be similar in configuration and/or functionality to any similarly named and/or numbered components described herein. Fewer or more components 712, 714, 716, 718, 720, 740, 742, 744, 750 and/or various configurations of the components 712, 714, 716, 718, 720, 740, 742, 744, 750 be included in the apparatus 710 without deviating from the scope of embodiments described herein.

According to some embodiments, the processing device 712 may be or include any type, quantity, and/or configuration of electronic and/or computerized processor that is or becomes known. The processing device 712 may comprise, for example, an Intel® IXP 2800 network processor or an Intel® XEON™ Processor coupled with an Intel® E7501 chipset. In some embodiments, the processing device 712 may comprise multiple inter-connected processors, microprocessors, and/or micro-engines. According to some embodiments, the processing device 712 (and/or the apparatus 710 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 710 comprises a server such as a blade server, necessary power may be supplied via a standard AC outlet, power strip, surge protector, a PDU, and/or Uninterruptible Power Supply (UPS) device (none of which are explicitly shown).

In some embodiments, the input device 714 and/or the output device 716 are communicatively coupled to the processing device 712 (e.g., via wired and/or wireless connections and/or pathways) and they may generally comprise any types or configurations of input and output components and/or devices that are or become known, respectively. The input device 714 may comprise, for example, a keyboard that allows an operator of the apparatus 710 to interface with the apparatus 710 (e.g., by a player, such as to participate in an online game session and/or by a user executing one or more analytical models based on transactional or long-term data stored in accordance with novel data storage techniques, as described herein). The output device 716 may, according to some embodiments, comprise a display screen and/or other practicable output component and/or device. The output device 716 may, for example, provide a game interface such as the interface 720 to a player (e.g., via a website). In some embodiments, the interface 720 may comprise portions and/or components of either or both of the input device 714 and the output device 716. According to some embodiments, the input device 714 and/or the output device 716 may, for example, comprise and/or be embodied in an input/output and/or single device such as a touch-screen monitor (e.g., that enables both input and output via the interface 720). According to some embodiments, analytical model results (e.g., determined based on transactional or long-term data stored in accordance with novel data storage techniques described herein) may be output via the output device 716.

In some embodiments, the communication device 718 may comprise any type or configuration of communication device that is or becomes known or practicable. The communication device 718 may, for example, comprise a Network Interface Card (NIC), a telephonic device, a cellular network device, a router, a hub, a modem, and/or a communications port or cable. In some embodiments, the communication device 718 may be coupled to provide data to a player device (not shown in FIG. 7), such as in the case that the apparatus 710 is utilized to provide a game interface to a player as described herein. The communication device 718 may, for example, comprise a cellular telephone network transmission device that sends signals indicative of game interface components to customer and/or subscriber handheld, mobile, and/or telephone device. According to some embodiments, the communication device 718 may also or alternatively be coupled to the processing device 712. In some embodiments, the communication device 718 may comprise an IR, RF, Bluetooth™, and/or Wi-Fi® network device coupled to facilitate communications between the processing device 712 and another device (such as a player device and/or a third-party device). According to some embodiments, analytical model results (e.g., determined based on transactional or long-term data stored in accordance with novel data storage techniques described herein) may be output via the communication device 718.

The memory device 740 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 740 may, according to some embodiments, store one or more of game instructions 742-1, data analysis instructions 742-2, player data 744-1, game data 744-2, tournament data 744-3, and/or prize data 744-4. In some embodiments, the game instructions 742-1, predictive model instructions 742-2, player data 744-1, game data 744-2, tournament data 744-3, and/or prize data 744-4 may be utilized by the processing device 712 to provide output information via the output device 716 and/or the communication device 718. In some embodiments, any or all of the data analysis instructions 742-2, the player data 744-1, game data 744-2, tournament data 744-3, and/or prize data 744-4 may be stored in in accordance with the novel data storage technique(s) described herein.

According to some embodiments, the game instructions 742-1 may be operable to cause the processing device 712 to process player data 744-1, game data 744-2, tournament data 744-3, and/or prize data 744-4. Player data 744-1, game data 744-2, tournament data 744-3, and/or prize data 744-4 received via the input device 714 and/or the communication device 718 may, for example, be analyzed, sorted, filtered, decoded, decompressed, ranked, scored, plotted, and/or otherwise processed by the processing device 712 in accordance with the game instructions 742-1. In some embodiments, player data 744-1, game data 744-2, tournament data 744-3, and/or prize data 744-4 may be fed by the processing device 712 through one or more mathematical and/or statistical formulas and/or models in accordance with the game instructions 742-1 to provide online games influenced (e.g., by personalizing and/or customizing promotions, offers, and/or loyalty rewards) by results from analytical models resolved via querying transactional and/or long-term data stored in accordance with the novel data storage technique(s) described herein.

In some embodiments, the data analysis instructions 742-2 may be operable to cause the processing device 712 to process player data 744-1, game data 744-2, tournament data 744-3, and/or prize data 744-4. Player data 744-1, game data 744-2, tournament data 744-3, and/or prize data 744-4 received via the input device 714 and/or the communication device 718 may, for example, be analyzed, sorted, filtered, decoded, decompressed, ranked, scored, plotted, and/or otherwise processed by the processing device 712 in accordance with the data analysis instructions 742-2. In some embodiments, player data 744-1, game data 744-2, tournament data 744-3, and/or prize data 744-4 may be fed by the processing device 712 through one or more mathematical and/or statistical formulas, models, and/or array-based binary tree storage structures in accordance with the data analysis instructions 742-2 to provide one or more online games influenced (e.g., by personalizing and/or customizing promotions, offers, and/or loyalty rewards) by results from analytical models resolved via querying transactional and/or long-term data stored in accordance with the novel data storage technique(s) described herein, such as in a manner that requires less memory space and faster processing times than previous systems.

Any or all of the exemplary instructions and data types described herein and other practicable types of data may be stored in any number, type, and/or configuration of memory devices that is or becomes known. The memory device 740 may, for example, comprise one or more data tables or files, databases, table spaces, registers, and/or other storage structures. In some embodiments, multiple databases and/or storage structures (and/or multiple memory devices 740) may be utilized to store information associated with the apparatus 710. According to some embodiments, the memory device 740 may be incorporated into and/or otherwise coupled to the apparatus 710 (e.g., as shown) or may simply be accessible to the apparatus 710 (e.g., externally located and/or situated).

In some embodiments, the apparatus 710 may comprise a cooling device 750. According to some embodiments, the cooling device 750 may be coupled (physically, thermally, and/or electrically) to the processing device 712 and/or to the memory device 740. The cooling device 750 may, for example, comprise a fan, heat sink, heat pipe, radiator, cold plate, and/or other cooling component or device or combinations thereof, configured to remove heat from portions or components of the apparatus 710.

Referring to FIG. 8A, FIG. 8B, FIG. 8C, FIG. 8D, and FIG. 8E, perspective diagrams of exemplary data storage devices 840*a-e* according to some embodiments are shown. The data storage devices 840*a-e* may, for example, be utilized to store instructions and/or data such as the game instructions 742-1, data analysis instructions 742-2, player data 744-1, game data 744-2, tournament data 744-3, and/or prize data 744-4, each of which is described in reference to FIG. 7 herein. In some embodiments, instructions stored on the data storage devices 840*a-e* may, when executed by a processor (such as the processor device 712 of FIG. 7), cause the implementation of and/or facilitate the method 500 described in conjunction with FIG. 5 herein, and/or portions thereof.

According to some embodiments, the first data storage device 840*a* may comprise one or more various types of internal and/or external hard drives. The first data storage device 840*a* may, for example, comprise a data storage medium 846 that is read, interrogated, and/or otherwise communicatively coupled to and/or via a disk reading device 848. In some embodiments, the first data storage device 840*a* and/or the data storage medium 846 may be configured to store information utilizing one or more magnetic, inductive, and/or optical means (e.g., magnetic, inductive, and/or optical-encoding). The data storage medium 946, depicted as a first data storage medium 846*a* for example (e.g., breakout cross-section "A"), may comprise one or more of a polymer layer 846*a*-1, a magnetic data storage layer 846*a*-2, a non-magnetic layer 846*a*-3, a magnetic base layer 846*a*-4, a contact layer 846*a*-5, and/or a substrate layer 846*a*-6. According to some embodiments, a magnetic read head 846*a* may be coupled and/or disposed to read data from the magnetic data storage layer 846*a*-2.

In some embodiments, the data storage medium 846, depicted as a second data storage medium 846*b* for example (e.g., breakout cross-section "B"), may comprise a plurality of data points 846*b*-2 disposed with the second data storage medium 846*b*. The data points 846*b*-2 may, in some embodiments, be read and/or otherwise interfaced with via a laser-enabled read head 848*b* disposed and/or coupled to direct a laser beam through the second data storage medium 846*b*.

In some embodiments, the second data storage device 840*b* may comprise a CD, CD-ROM, DVD, Blu-Ray™ Disc, and/or other type of optically-encoded disk and/or other storage medium that is or becomes know or practicable. In some embodiments, the third data storage device 840*c* may comprise a USB keyfob, dongle, and/or other type of flash memory data storage device that is or becomes know or practicable. In some embodiments, the fourth data storage device 840*d* may comprise RAM of any type, quantity, and/or configuration that is or becomes practicable and/or desirable. In some embodiments, the fourth data storage device 840*d* may comprise an off-chip cache such as a Level 2 (L2) cache memory device. According to some embodiments, the fifth data storage device 840*e* may comprise an on-chip memory device such as a Level 1 (L1) cache memory device.

The data storage devices 840*a*-*e* may generally store program instructions, code, and/or modules that, when executed by a processing device cause a particular machine to function in accordance with one or more embodiments described herein. The data storage devices 840*a*-*e* depicted in FIG. 8A, FIG. 8B, FIG. 8C, FIG. 8D, and FIG. 8E are representative of a class and/or subset of computer-readable media that are defined herein as "computer-readable memory" (e.g., non-transitory memory devices as opposed to transmission devices or media).

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

VI. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "casual game", as the term is used herein (unless specified otherwise), may generally comprise (and in specific embodiments may be expressly limited to) a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein (unless specified otherwise), generally refers to (and in specific embodiments may be expressly limited to) a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise (and in specific embodiments may be expressly limited to) a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

The term "game provider", as used herein (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game— e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise (and in specific embodiments may be expressly limited to) a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers. A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

What is claimed is:

1. A method for storing and reconstituting data descriptive of a plurality of time-based data elements resulting from play of an online game, thereby defining a data set for the play of the online game, the method reducing storage space requirements while permitting individual data values to be reconstituted, comprising:

identifying, by a specially-programmed electronic processing device, the data set, wherein the data set comprises the plurality of time-based data elements and wherein the plurality of time-based data elements comprises, for each of a plurality of time periods, a plurality of data values;

identifying, by the specially-programmed electronic processing device, a plurality of levels of aggregation, each level of aggregation corresponding to one of the time periods from the plurality of time periods;

computing, by the specially-programmed electronic processing device and for each level of aggregation, a mathematical function descriptive of a distribution of the data values of the data set within the level of aggregation;

aggregating, by the specially-programmed electronic processing device and for each level of aggregation, the data values of the data set within the level of aggregation;

storing, by the specially-programmed electronic processing device, in a database, and for each level of aggregation, (i) the aggregated value for the data set within the level of aggregation, and (ii) at least one coefficient associated with the mathematical function descriptive of the distribution of the data values of the data set within the level of aggregation; and reconstituting a particular data value having been recorded for a particular day and being part of the previously aggregated data set, by executing an analytical procedure, comprising:

receiving, after the storing and from a user, a request for the particular data value for the particular day;

retrieving, from the database, and in response to the receiving of the request, a subset of the stored data indicative of the (i) aggregated values for the data set within at least one of the plurality of levels of aggregation that contains the particular day, and (ii) the at least one coefficient associated with the mathematical function descriptive of the distributions of the values of the data set within the at least one of the plurality of levels of aggregation;

resolving the mathematical function for the particular value on the particular day;

determining, based on the resolving, a result of the analytical procedure, the result comprising at least the particular value; and outputting, via an output device, an indication of the result comprising at least an indication of the particular value for the particular day.

2. The method of claim 1, wherein the data set comprises at least one of a set of time stamped data, transactional data, and event data.

3. The method of claim 2, wherein the data set comprises data descriptive of wagers placed by an online game player.

4. The method of claim 1, wherein the plurality of time periods, comprise:

(i) a first time period corresponding to the previous sixty minutes;

(ii) a second time period corresponding to the previous twenty-four hours;

(iii) a third time period corresponding to the previous seven days;

(iv) a fourth time period corresponding to the previous four weeks; and (v) a fifth time period corresponding to the previous thirteen months.

5. The method of claim 4, wherein the plurality of time periods, further comprise on or more of:

(vi) a sixth time period corresponding to the previous four years; and (vii) a seventh time period corresponding to a time period beginning at recorded particular date/time and ending with a most recent time for which data has been recorded.

6. The method of claim 1, wherein the mathematical function descriptive of the distribution of the data values of the data set within each level of aggregation comprises a polynomial function.

7. The method of claim 6, wherein the polynomial function comprises a six degree polynomial function and wherein the at least one coefficient stored in the database comprises six coefficients descriptive of the six degree polynomial.

8. The method of claim 1, further comprising:

storing, by the specially-programmed electronic processing device, in the database, and in association with each level of aggregation, an indication of a time stamp and an identifier of an online game player.

* * * * *